(12) United States Patent
Takano et al.

(10) Patent No.: US 11,474,549 B2
(45) Date of Patent: Oct. 18, 2022

(54) SEMICONDUCTOR INTEGRATED CIRCUIT FOR REGULATOR, AND FAN MOTOR SYSTEM

(71) Applicants: Yoichi Takano, Hadano (JP);
Shinichiro Maki, Hiratsuka (JP)

(72) Inventors: Yoichi Takano, Hadano (JP);
Shinichiro Maki, Hiratsuka (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 21 days.

(21) Appl. No.: 17/117,705

(22) Filed: Dec. 10, 2020

(65) Prior Publication Data
US 2021/0191440 A1    Jun. 24, 2021

(30) Foreign Application Priority Data
Dec. 18, 2019  (JP) .............................. JP2019-227870

(51) Int. Cl.
*G05F 1/575* (2006.01)
*G05F 1/573* (2006.01)
(Continued)

(52) U.S. Cl.
CPC .............. *G05F 1/575* (2013.01); *G05F 1/445* (2013.01); *G05F 1/561* (2013.01); *G05F 1/573* (2013.01)

(58) Field of Classification Search
CPC .......... G05F 1/462; G05F 1/465; G05F 1/468; G05F 1/56; G05F 1/575; G05F 1/562;
(Continued)

(56) References Cited

U.S. PATENT DOCUMENTS

| 8,847,569 B2 | 9/2014 | Terada et al. |
| 9,606,556 B2 | 3/2017 | Takano et al. |

(Continued)

FOREIGN PATENT DOCUMENTS

| JP | 2015070727 A | 4/2015 |
| JP | 2017045096 A | 3/2017 |
| JP | 2019185732 A | 10/2019 |

OTHER PUBLICATIONS

U.S. Appl. No. 16/920,309; First Named Inventor: Yoichi Takano; Title: "Power Control Semiconductor Device and Variable Output Voltage Power Supply"; filed Jul. 2, 2020.
(Continued)

*Primary Examiner* — Thienvu V Tran
*Assistant Examiner* — Nusrat Quddus
(74) *Attorney, Agent, or Firm* — Holtz, Holtz & Volek PC (57) ABSTRACT

Disclosed is a semiconductor integrated circuit for a regulator, including: a voltage control transistor connected between a voltage input terminal to which a DC voltage is input and an output terminal; a control circuit that controls the voltage control transistor according to a feedback voltage of an output; a first transistor which is provided in parallel with the voltage control transistor and to which an electric current in a proportional reduction from an electric current flowing to the voltage control transistor flows; a first comparison circuit that determines which of the electric current flowing to the first transistor and a predetermined current value is larger; and a first output terminal for outputting the determination result. An output of the first comparison circuit is inverted in response to the flowing to the first transistor of the electric current smaller than a preset rotation lock detection current value.

6 Claims, 3 Drawing Sheets

(51) Int. Cl.
*G05F 1/56* (2006.01)
*G05F 1/445* (2006.01)

(58) Field of Classification Search
CPC .......... G05F 1/565; G05F 1/567; G05F 1/569;
G05F 1/571; G05F 1/573; G05F 1/5735;
G05F 3/10; G05F 3/16; G05F 3/18; G05F
3/185; G05F 3/20; G05F 3/26; G05F
3/30; G05F 3/205; G05F 3/22; G05F
3/24; G05F 3/222; G05F 3/242; G05F
3/225; G05F 3/227; G05F 3/245; G05F
3/247; G05F 3/262; G05F 3/265; G05F
3/267; G05F 1/463; G05F 1/46; G05F
1/461
See application file for complete search history.

(56) References Cited

U.S. PATENT DOCUMENTS

| | | | |
|---|---|---|---|
| 9,952,610 B1 | 4/2018 | Yokoyama et al. | |
| 9,996,093 B2 | 6/2018 | Takano et al. | |
| 10,063,135 B2 | 8/2018 | Maki et al. | |
| 10,466,728 B2 * | 11/2019 | Maki | G05F 1/575 |
| 10,831,222 B2 | 11/2020 | Maki et al. | |
| 2009/0184672 A1 * | 7/2009 | Suzuki | H02P 6/085 |
| | | | 318/400.13 |
| 2015/0153751 A1 * | 6/2015 | Shigehara | G05F 1/575 |
| | | | 323/281 |
| 2017/0063232 A1 * | 3/2017 | Takano | H02M 3/158 |
| 2018/0097439 A1 * | 4/2018 | Maki | G05F 1/56 |

OTHER PUBLICATIONS

U.S. Appl. No. 17/061,281; First Named Inventor: Shinichiro Maki; Title: "Semiconductor Apparatus for Power Supply Control and Output Voltage Variable Power Supply Apparatus"; filed Oct. 1, 2020.

U.S. Appl. No. 17/061,370; First Named Inventor: Shinichiro Maki; Title: "Semiconductor Apparatus for Power Supply Control and Output Voltage Variable Power Supply Apparatus"; filed Oct. 1, 2020.

U.S. Appl. No. 16/861,340; First Named Inventor: Shinichiro Maki; Title: Power Control Semiconductor Device, Variable Output Voltage Power Supply, and Designing Method; filed Apr. 29, 2020.

* cited by examiner

FIG. 4

SEMICONDUCTOR INTEGRATED CIRCUIT FOR REGULATOR, AND FAN MOTOR SYSTEM

CROSS-REFERENCE TO RELATED APPLICATION

This application is based upon and claims the benefit of priority from the prior Japanese Patent Application No. 2019-227870, filed on Dec. 18, 2019, the entire contents of which are incorporated herein by reference.

BACKGROUND

Technical Field

The present invention relates to a technique which is used and effective in a semiconductor integrated circuit (regulator IC) for forming a voltage regulator such as a series regulator that is a DC power supply device and that furthermore converts a DC voltage, for example, and a fan motor system that uses the semiconductor integrated circuit.

Background Art

There is a series regulator (hereinafter, simply referred to as a regulator) as a power supply device that controls a transistor provided between a DC voltage input terminal and an output terminal and outputs a DC voltage of a desired electric potential. As a usage of such a regulator, there is a power supply device for supplying a DC power source to a blower (fan motor system) for device cooling installed in a car or a computer, for example.

The blower includes a motor that rotates a fan and a driver IC (motor driver), and the regulator supplies a power supply voltage to the driver IC. As the method for controlling the number of rotations of the fan, there are a method of changing the output voltage (power supply voltage) of the regulator, and a method of controlling the driver circuit with the PWM (pulse width modulation) pulse.

The blower has a possibility that the device to be cooled abnormally generates the heat and breaks down when a rotation lock state occurs, the rotation lock state stopping the rotation of fan in a state in which the power supply voltage is supplied to the driver circuit. Thus, there has been conventionally proposed an invention regarding the motor driver that includes a lock detection circuit which outputs a protection signal causing the drive signal of the motor to stop for a fixed time when the lock state is detected (for example, see JP 2015-70727 A). There is also proposed a motor system that enables the controller for rotation control to detect the rotation lock state with a signal from the encoder or the hall element.

As for the regulator, there has been conventionally a regulator that includes a function of detecting the short-circuiting state of the output terminal and an overcurrent protection function. However, a regulator that includes a circuit detecting the lock state of the motor has not been proposed. The invention regarding the regulator IC that includes the short-circuiting abnormality detecting function and the overcurrent protection function (current limit circuit) is described in JP 2017-45096 A, for example.

In the motor system using a motor driver that includes a lock detection circuit described in JP 2015-70727 A, there is a problem that, when the motor driver breaks down, the breakdown cannot be detected by the power supply device, and thus it is not possible to avoid the abnormal heat generation of the device.

When a motor system is configured to enable the controller (microcomputer) for the rotation control to detect the rotation lock state with a signal from the encoder or the hall element, it is necessary to use the motor including the encoder or the hall element and provide wiring for inputting the signal from the motor to the microcomputer. Thus, there is a problem of increase in the cost.

SUMMARY

The present invention has been made in consideration of the above problems, and an object of the present invention is to enable detecting the rotation lock state of the motor even when the motor driver having the motor lock detecting function breaks down, in the semiconductor integrated circuit (regulator IC) forming the DC power supply device such as a series regulator.

Another object of the present invention is to provide a regulator IC that can form the motor system capable of detecting the rotation lock state without increasing the cost.

To achieve at least one of the abovementioned objects, according to an aspect of the present invention, there is provided a semiconductor integrated circuit for a regulator, the semiconductor integrated circuit including: a voltage control transistor that is connected between a voltage input terminal to which a DC voltage is input and an output terminal; a control circuit that controls the voltage control transistor according to a feedback voltage of an output; a first transistor which is provided in parallel with the voltage control transistor and to which an electric current in a proportional reduction from an electric current flowing to the voltage control transistor flows; a first comparison circuit that determines which of the electric current flowing to the first transistor and a predetermined current value is larger; and a first output terminal for outputting outside a determination result by the first comparison circuit, and an output of the first comparison circuit is inverted in response to the electric current flowing to the first transistor, the electric current being smaller than a rotation lock detection current value which is set in advance.

Preferably, the semiconductor integrated circuit may further includes a first external terminal for connecting a first current-voltage converting element that converts the electric current flowing to the first transistor into a voltage, and the first comparison circuit compares a voltage corresponding to the predetermined current value with the voltage obtained by converting of the electric current by the first current-voltage converting element connected to the first external terminal.

Preferably, in the semiconductor integrated circuit for the regulator, a first capacity element may be connected to the first external terminal in parallel with the first current-voltage converting element.

Preferably, the semiconductor integrated circuit for the regulator may further include: a second transistor which is provided in parallel with the voltage control transistor and the first transistor and to which an electric current in a proportional reduction from an electric current flowing to the voltage control transistor flows; a second current-voltage converting element that converts the electric current flowing to the second transistor into a voltage; and a second comparison circuit that compares the voltage obtained by converting of the electric current by the second current-voltage converting element with a second comparison voltage corresponding to a voltage obtained by current-voltage conversion of a short-circuiting abnormality detection current value which is set in advance, and determines which of the voltage obtained by the second current-voltage converting element and the second comparison voltage is larger, and an output of the second comparison circuit is inverted in response to the electric current flowing to the second transistor, the electric current being larger than the short-circuiting abnormality detection current value which is set in advance.

Preferably, the semiconductor integrated circuit for the regulator may further include a delay circuit that delays an output of the second comparison circuit, and a signal obtained by having a logical sum of an output signal of the first comparison circuit and a signal delayed by the delay circuit is able to be output as an abnormality detection signal from the first output terminal.

Preferably, the semiconductor integrated circuit for the regulator may further include a second external terminal for connecting a second capacity element to form the delay circuit.

According to another aspect of the present invention, there is provided a semiconductor integrated circuit for a regulator for forming a power supply device that supplies an operation voltage to a drive circuit which drives a motor to rotate, the semiconductor integrated circuit including: a voltage control transistor that is connected between a voltage input terminal to which a DC voltage is input and an output terminal to which an external load is connected; and a control circuit that controls the voltage control transistor according to a feedback voltage of an output, and a flag indicating an abnormality is raised in response to an electric current flowing to the voltage control transistor becoming smaller than a rotation lock detection current value which is set in advance.

Preferably, the semiconductor integrated circuit for the regulator may further include: a rotation lock detection circuit which detects that the electric current flowing to the voltage control transistor becomes smaller than the rotation lock detection current value; and an external terminal to output a detection result of the rotation lock detection circuit, and an abnormality signal is output from the external terminal in response to detection of a rotation lock state by the rotation lock detection circuit.

According to another aspect of the present invention, there is provided a fan motor system, including: a motor that rotates a fan; a drive circuit that drives the motor to rotate; and the semiconductor integrated circuit for the regulator that supplies an operation voltage to the drive circuit.

BRIEF DESCRIPTION OF THE DRAWINGS

The accompanying drawings are not intended as a definition of the limits of the invention but illustrate embodiments of the invention, and together with the general description given above and the detailed description of the embodiments given below, serve to explain the principles of the invention, wherein.

DESCRIPTION OF EMBODIMENTS

Hereinafter, a preferred embodiment of the present invention will be described with reference to the drawings.

Figure 1:
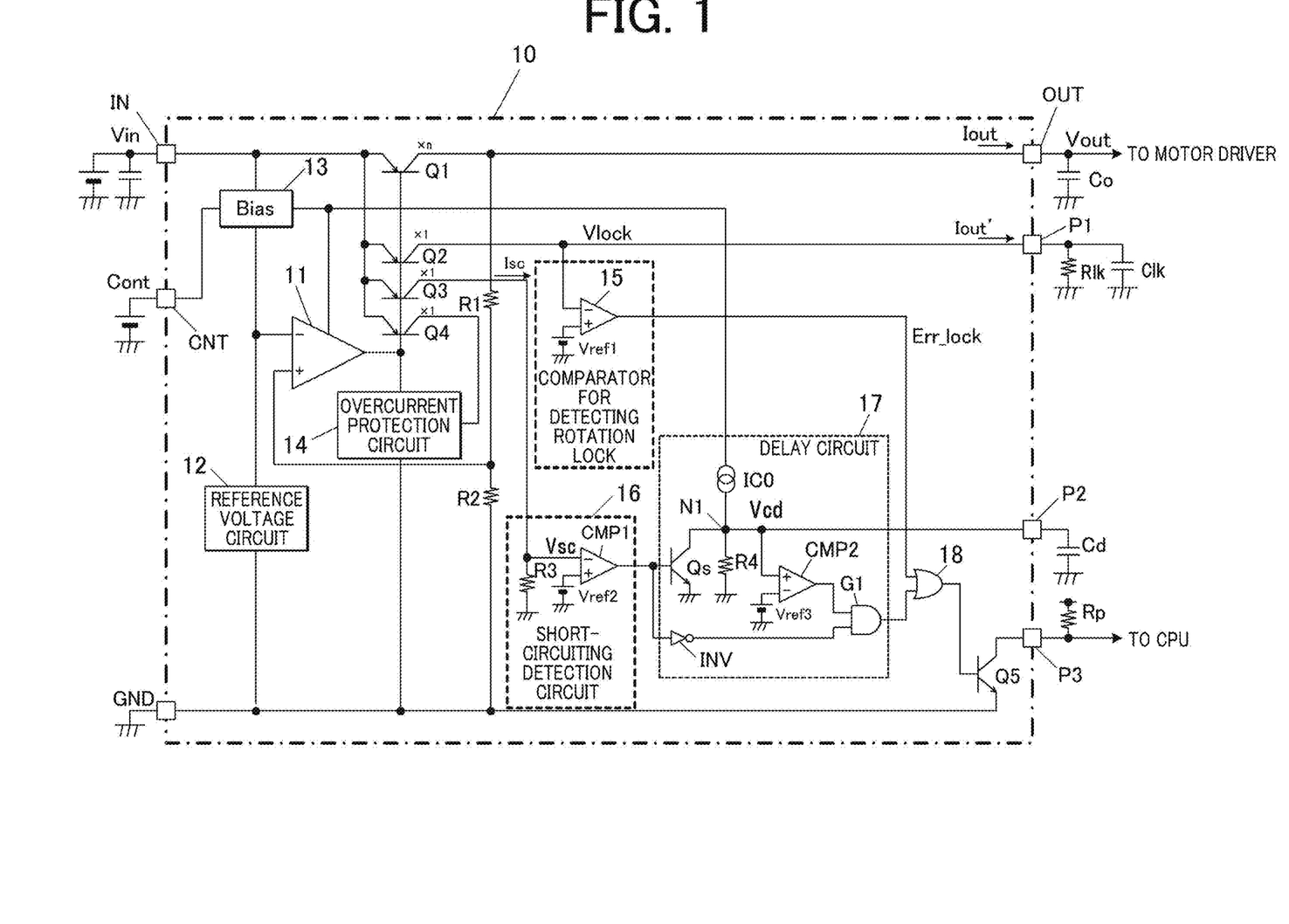
FIG. 1 is a circuit configuration view showing an embodiment of a regulator IC according to the present invention.

FIG. 1 shows an embodiment of a series regulator as a DC power supply device to which the present invention is applied. In FIG. 1, the portion surrounded by the dashed-dotted line is formed as a semiconductor integrated circuit (regulator IC) 10 on a semiconductor chip such as a single-crystal silicon, and has the output terminal OUT of the regulator IC 10 connected to a capacitor Co to function as a DC power supply device (LDO) that supplies a stable DC voltage.

In the regulator IC 10 in the present embodiment, as shown in FIG. 1, a voltage control transistor Q1 formed of a PNP bipolar transistor is connected between the voltage input terminal IN to which the DC voltage Vin is applied and the output terminal OUT, and bleeder resistors R1 and R2 that divide the output voltage Vout are connected in series between the output terminal OUT and the ground line to which the ground potential GND is applied.

The voltage VFB divided by the bleeder resistors R1 and R2 is fed back to a non-inverting input terminal of an error amplifier (amplifying circuit) 11 as a control circuit that controls the base terminal of the voltage control transistor Q1. The error amplifier 11 controls the voltage control transistor Q1 according to the potential difference between the feedback voltage VFB of output and a predetermined reference voltage Vref to control the output voltage Vout to be a desired electric potential.

The regulator IC 10 in the present embodiment includes: a reference voltage circuit 12 for generating the reference voltage Vref applied to the inverting input terminal of the above error amplifier 11; a bias circuit 13 that makes an operation current flow to the error amplifier 11 and the reference voltage circuit 12; and an overcurrent protection circuit (current limiter) 14 that is connected to the base terminal of the voltage control transistor Q1 for limiting the output current.

The reference voltage circuit 12 can be formed by serial resistors, the Zener diode, and a band gap circuit for the configuration of bipolar or a CMOS reference voltage circuit (for example, depression type MOSFET+enhancement type MOSFET) for the configuration of CMOS, for example. The bias circuit 13 has a function of supplying and interrupting the bias current to the error amplifier 11 according to the on/off control signal Cont which is input to the external terminal CNT from a microcomputer (CPU) outside the chip, or the like. When the output current increases due to the abnormality of the load or the like to decrease the output voltage and the error amplifier 11 attempts to lower the base voltage to make more electric current flow to the transistor Q1, the overcurrent protection circuit 14 limits the output current by clamping so that the base current does not increase to exceed a predetermined level.

The regulator IC 10 in the present embodiment includes PNP bipolar transistors Q2, Q3 and Q4 that are provided in parallel with the voltage control transistor Q1 and form a current mirror circuit with the transistor Q1. The same voltage as the voltage applied to the base terminal of the voltage control transistor Q1 is applied to the base terminal as the control terminal of each of the transistors Q2, Q3 and Q4. Thus, the electric current proportional to the collector current of Q1 (1/N of the current) flows to Q2, Q3 and Q4 in accordance with the size ratio N of the element. The setting is made such that the electric current proportional to the number of elements flows when the transistor Q1 is formed by connecting N transistors of a same size in parallel and each of the transistors Q2, Q3 and Q4 is formed of a single transistor, for example.

The regulator IC 10 in the present embodiment includes: an external terminal P1 for connecting a resistor Rlk that performs current-voltage conversion outside the chip; an external terminal P2 for connecting a capacitor Cd; and an external terminal P3 for connecting a pull-up resistor Rp. The collector terminal of the current mirror transistor Q2 is connected to the external terminal P1.

The regulator IC 10 includes: a comparator 15 for detecting the rotation lock, the comparator 15 having the inverting input terminal connected to the external terminal P1 and having the non-inverting input terminal to which a reference voltage Vref1 is applied; a short-circuiting detection circuit 16 that includes a resistor R3 connected in series to the transistor Q3 and a comparator CMP1 having the inverting input terminal to which an electric potential of the connection node between the R3 and Q3 is applied, and that detects the short-circuiting abnormality of the output terminal; and a delay circuit 17 for delaying the output of the short-circuiting detection circuit 16 (short-circuiting abnormality detection signal).

The regulator IC 10 includes an OR gate 18 that has a logical sum of the output of delay circuit 17 and the output of the comparator 15; and an NPN transistor Q5 of an open collector type that has the base terminal to which the output voltage of OR gate 18 is applied and has the collector terminal connected to the external terminal P3. The capacitor Cd connected to the external terminal P2 sets a delay time of the delay circuit 17.

When the output of the comparator 15 or the output of the short-circuiting detection circuit 16 (comparator CMP1) changes to a high level, the transistor Q5 is turned on to make the electric current flow to the pull-up resistor Rp, the voltage of the external terminal P3 changes to a low level, which is supplied as the abnormality detection signal Err to the CPU.

The short-circuiting detection circuit 16 increases the voltage decrease amount of resistor R3 when the output terminal is short-circuited and a large electric current flows to the transistors Q1 and Q3. When the electric potential of the inverting input terminal of the comparator CMP1 becomes higher than the reference voltage Vref2 applied to the non-inverting input terminal, the output of comparator CMP1 changes to a low level.

The delay circuit 17 is configured by including a constant current source IC0, a resistor R4 connected in series between the constant current source IC0 and the ground point, a switch transistor Qs connected in parallel with the resistor R4, a comparator CMP2, and an AND gate G1 that receives, as input, the output of comparator CMP2 and a signal obtained by inverting the output of comparator CMP1 for detecting the short-circuiting abnormality with an inverter INV. The output voltage of comparator CMP1 for detecting the short-circuiting abnormality is input to the base terminal of the transistor Qs.

In a normal operation state in which the output of the comparator CMP1 for detecting the short-circuiting abnormality is at a low level, the delay circuit 17 is in an on state having the base terminal of the transistor Qs to which a high level is applied, and the capacitor Cd is in a discharged state.

When the comparator CMP1 detects a large electric current due to the short-circuiting state of the output terminal and the output changes to a high level, the transistor Qs is turned off.

The capacitor Cd of the external terminal P2 is gradually charged, and the electric potential of the connection node N1 gradually increases. When a predetermined time has elapsed and the electric potential of the connection node N1 becomes higher than a reference voltage Vref3 of the comparator CMP2, the output of comparator CMP2 changes from a low level to a high level. Thus, when short-circuiting abnormality is detected, the transistor Q5 is turned on, an electric current flows to the pull-up resistor Rp, the electric potential of external terminal P3 changes from a high level to a low level, and the short-circuiting abnormality detection signal is output to the CPU.

The delay time of delay circuit 17 is set to be a slightly longer time than a period during which the rush current flows at the rise of power supply. By providing the above-described delay circuit 17, it is possible to avoid the output of wrong detection pulse caused by the detection of rush current.

By connecting an external capacitor Cd of the external terminal P2 to the connection node N1 between the constant current source IC0 and the resistor R4, it is possible to increase the delay time without increasing the chip size.

Figure 2:
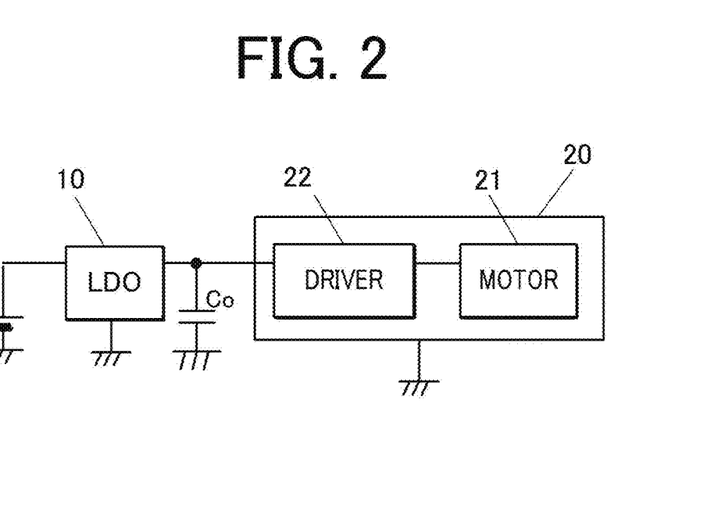
FIG. 2 is a functional block diagram showing a configuration example of a fan motor system using the regulator in FIG. 1 as a power supply device of a motor driver.

As shown in FIG. 2, for example, a fan motor system is formed by including: a motor 21 that rotates a fan; a driver (motor drive IC) 22 that drives the motor 21 to rotate; and a power supply device (LDO+Co) 10 that supplies the power supply voltage as an operation voltage to the driver circuit. In the fan motor system, the resistance value is set such that the voltage between both terminals of the external resistor Rlk of the regulator IC 10 is a voltage equal to or lower than the reference voltage Vref1 when rotation lock occurs at the motor 21 and the electric current flowing to the driver 22 is lowered to be equal to or lower than a small current value such as several milliamperes, for example.

In the fan motor system in FIG. 2, an IC having a rotation lock detecting function may be used as the driver 22. In this configuration, there are merits of enabling double protection by the driver and the LDO and improving the safety of system. The motor 21 and the driver 22 may be separate parts or may be configured as a product (motor driver) 20 that is contained in a single housing.

As described above, in the present embodiment, the current value to detect the rotation lock is set with the external resistor Rlk. Thus, it is possible to arbitrarily set the detection current value (threshold value) according to the system to be used. By providing the external terminal P1 with the resistor Rlk as an external element, it is possible to improve the temperature dependence with a high accuracy of resistance value, and set the detection current value with a high accuracy.

The resistor Rlk and the capacitor Clk can be incorporated into the IC to omit the external terminal P1. Thus, it is possible to decrease the number of external terminals (pins) of IC.

Figure 3:
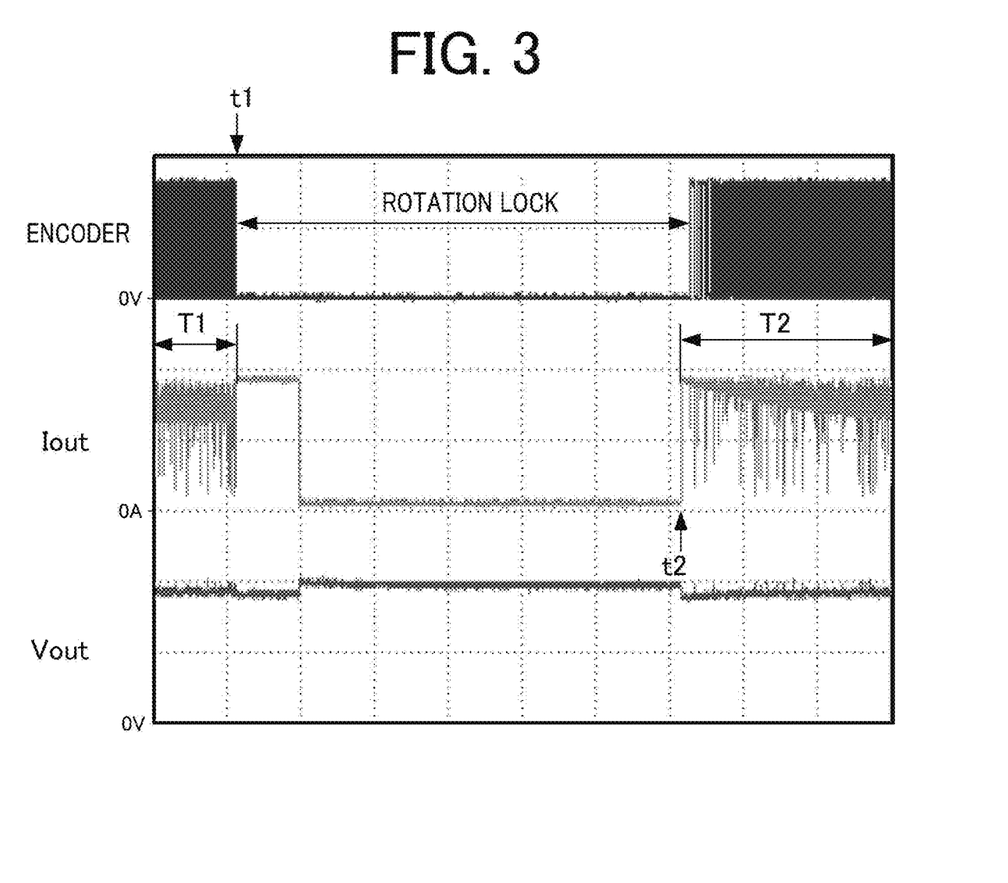
FIG. 3 is a timing chart showing changes in the output current and the output voltage of the regulator IC when rotation lock of the motor occurs in the fan motor system of FIG. 2.

The capacitor Clk is connected to the external terminal P1 in parallel with the external resistor Rlk. When a load to receive the supply of output of the regulator in the present embodiment is a motor driver, the electric current Iout output from the regulator IC 10 changes up and down as in the periods T1 and T2 of Iout in FIG. 3 in accordance with the rotation of motor. In response to this change, the electric current flowing to the transistor Q2 and the resistor Rlk also change and whisker noise is generated in Vlock. Thus, the comparator 15 possibly performs wrong detection. However, by providing the above capacitor Clk in parallel with the resistor Rlk, it is possible to absorb the whisker noise and prevent the wrong detection operation of the comparator 15. In FIG. 3, t1 is the timing when the rotation lock starts and t2 is the timing when the rotation lock ends.

By providing the delay circuit 17 after the short-circuiting detection circuit 16, the regulator in the present embodiment is configured to prevent the short-circuiting detection circuit 16 from detecting the rush current flowing toward the capacitor Co which is connected to the output terminal OUT at the time of power activation of IC and changing the output (short-circuiting abnormality detection signal) to a high level which causes the external terminal P3 to output the abnormality detection signal Err. The capacitor Cd for setting the delay time can be incorporated in the IC or the delay of the rush current can be set by the CPU (software). Thus, it is possible to eliminate the capacitor Cd and omit the external terminal P2. Thereby, it is possible to reduce the number of external terminals (pins) of the IC.

When the overcurrent protection circuit 14 detects an overcurrent state on the basis of the collector current of the current mirror transistor Q4, the overcurrent protection function works by limiting the electric current flowing to the voltage control transistor Q1. As the overcurrent protection circuit having such a function, various circuit types have been conventionally proposed. Since the overcurrent protection circuit of a circuit type similar to any of the conventional types can be used in the present embodiment, the detailed explanation of the configuration will be omitted.

The regulator IC of the present embodiment in FIG. 1 is configured to output, from the common terminal P3, the signal which is output when the comparator 15 detects the rotation lock and the signal which is output when the short-circuiting detection circuit 16 detects the short-circuiting abnormality. However, two external terminals may be provided to output separate detection signals (flags). Though the short-circuiting detection circuit 16 and the overcurrent protection circuit 14 are configured as separate circuits in FIG. 1, the overcurrent protection circuit 14 can be used as a substitute for the comparator (CMP1) of the short-circuiting detection circuit 16, and thereby the circuit can be simplified.

Figure 4:
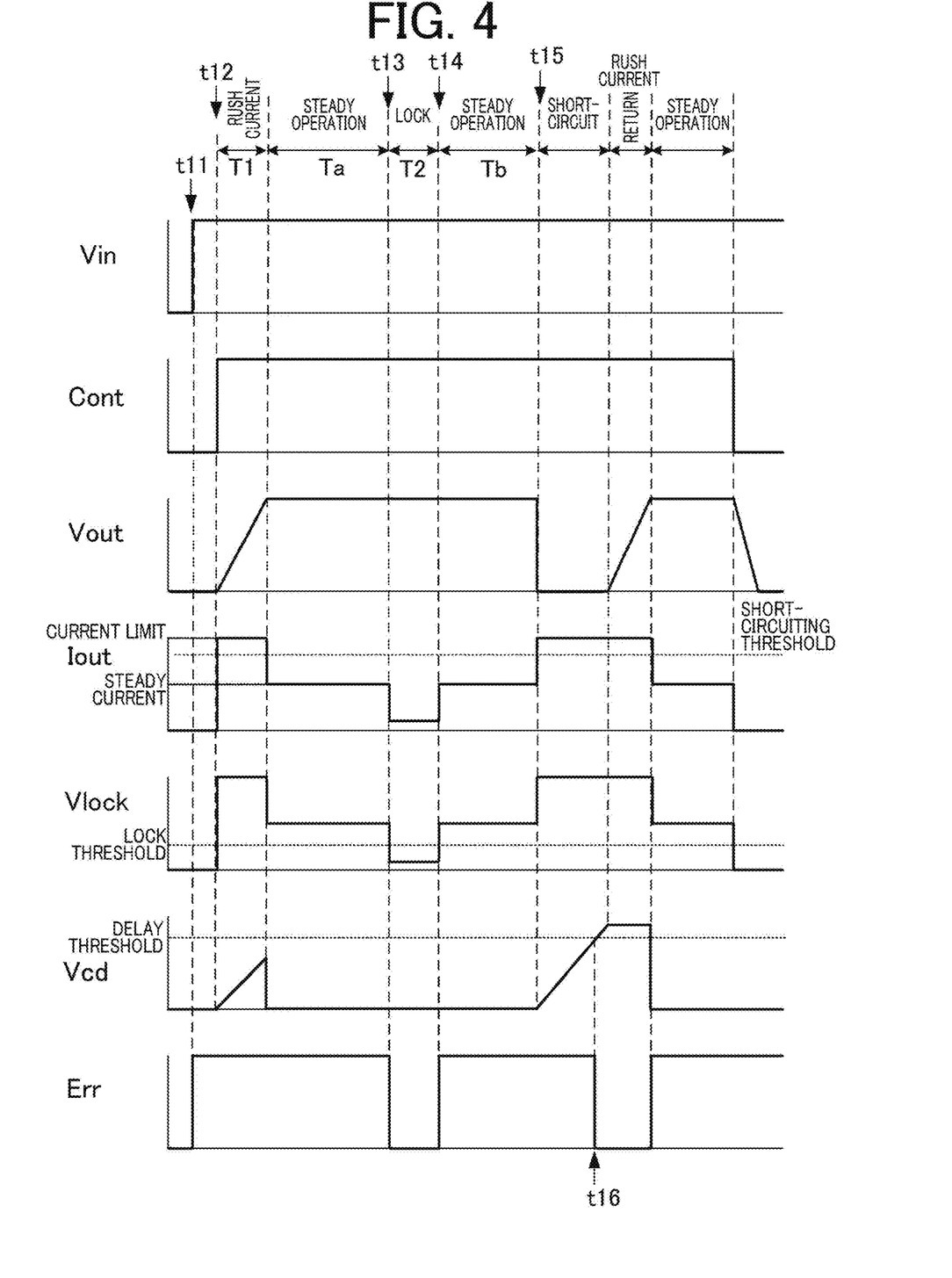
FIG. 4 is a timing chart showing changes in the output current and the output voltage of the regulator IC and the voltage of the external terminal of the IC when the rotation lock of the motor occurs.

The operation of the regulator IC 10 in the present embodiment will be described by using the timing chart in FIG. 4. FIG. 4 shows timings in a case where the steady operation is performed for a while after the power activation and start of the operation of regulator, and thereafter the rotation lock state occurs and returns to the steady operation state, and thereafter the short-circuiting state occurs and the regulator returns to the steady operation state again.

As shown in FIG. 4, when the input voltage Vin rises at the timing t11 and the signal Cont of the control terminal CNT is changed to a high level from outside at the timing t12, the regulator IC 10 starts to operate and the output voltage Vout is controlled to rise to a predetermined voltage. In the transition period until the output voltage Vout rises to the predetermined voltage, the rush current (inrush current) flows toward the capacitor Co connected to the output terminal. Thereafter, the steady current flows according to the state of the load (period Ta).

In the regulator in the present embodiment, the short-circuiting detection signal is output from the short-circuiting detection circuit 16 due to the flow of a rush current larger than the steady current in the period T1 immediately after the power activation. However, since the delay circuit 17 is provided, the turning on of the transistor Q5, that is, the change to a low level of the abnormality detection signal Err is prevented.

When a lock state occurs in the motor as the load in the steady operation state, as in the period T2, the output current Iout rapidly decreases (timing t13). Since the electric current flowing to the current mirror transistor Q2 also decreases similarly, the voltage Vlock of the external terminal P1 becomes lower than the lock detection threshold value (Vref1), and the comparator 15 detects this and changes its output to a high level. As a result, the transistor Q5 is turned on to change the signal Err output from the external terminal P3 to a low level, and the CPU which receives this signal can detect that the rotation lock occurred. When the rotation lock is detected, it is possible to avoid the accident by stopping or limiting the operation of the device cooled by the fan or the operation of the entire set.

Thereafter, when the lock state is released at the timing t14, the regulator IC 10 restarts the steady operation and the output current Iout increases.

When the short-circuiting occurs in the output terminal and the load circuit at the timing t15, the output current Iout and the current Isc of the transistor Q3 increase, the short-circuiting detection circuit 16 detects this increase, the output of comparator CMP1 is inverted to turn off the transistor Qs. Thus, the external capacitor Cd of the external terminal P2 is charged by the constant current source IC0 in the delay circuit 17 and the electric potential Vcd of the node N1 gradually increases. When the electric potential Vcd exceeds the delay threshold value (Vref3), the output of the comparator CMP2 changes to a high level (timing t16). On the condition that the output of the inverter INV is a high level (the output of the comparator CMP1 is a low level), the output of the ANG gate G1 changes to a high level, the transistor Q5 is turned on, and the signal Err output from the external terminal P3 changes to a low level to notify the CPU that the abnormality was detected.

As mentioned above, by providing the delay circuit 17, the regulator IC 10 in the present embodiment prevents that the rush current flows immediately after the operation of regulator IC 10 starts, this rush current changes the output of short-circuiting detection circuit 16 to a high level to turn on the transistor Q5, and the abnormality detection signal Err changes to a low level. As for the rush current, the technique of providing the soft start circuit to limit the rush current is known, and the above delay circuit 17 and the external terminal P2 are not necessary when the soft start circuit is provided. Alternatively, the CPU which receives the abnormality detection signal Err may execute a dead band program of performing the processing of neglecting the short-circuiting detection pulse immediately after the power activation.

Though the present invention has been described specifically on the basis of the above embodiment, the present invention is not limited to the above embodiment. For example, though the on/off control is made to the regulator IC 10 by the on/off control signal Cont which is input to the external terminal CNT in the present embodiment, a known output voltage change circuit as described in JP 2019-185732 A may be provided in the regulator IC to form an output voltage changeable power supply device.

In the present embodiment, the abnormality detection signal is output from the external output terminal when the rotation lock state is detected. However, a temporary storage section such as a status register may be provided inside the IC so that, when the rotation lock state is detected, a flag storing information is raised and the CPU can recognize the occurrence of rotation lock by reading the flag. Though the overcurrent protection circuit (current limit circuit) 14 and the short-circuiting detection circuit 16 are configured as separate circuits in the present embodiment, the overcurrent protection circuit (current limit circuit) 14 and the short-circuiting detection circuit 16 may be configured as a common circuit as described in JP 2017-45096 A.

The above embodiment shows using the bipolar transistor as the voltage control transistor Q1 and the current mirror transistors Q2 to Q4. However, the MOSFET may be used instead of the bipolar transistor. In the present embodiment, the bleeder resistors R1 and R2 which divide the output voltage are provided inside the chip. However, a voltage dividing circuit formed of an external resistor may be provided so that the voltage which was divided outside the chip is input from the external terminal to the error amplifier 11 or only the bleeder resistor R2 among the bleeder resistors R1 and R2 may be connected as an external resistor.

According to an aspect of the present invention, there is provided a semiconductor integrated circuit for a regulator, the semiconductor integrated circuit including: a voltage control transistor that is connected between a voltage input terminal to which a DC voltage is input and an output terminal; a control circuit that controls the voltage control transistor according to a feedback voltage of an output; a first transistor which is provided in parallel with the voltage control transistor and to which an electric current in a proportional reduction from an electric current flowing to the voltage control transistor flows; a first comparison circuit that determines which of the electric current flowing to the first transistor and a predetermined current value is larger; and a first output terminal for outputting outside a determination result by the first comparison circuit, and an output of the first comparison circuit is inverted in response to the electric current flowing to the first transistor, the electric current being smaller than a rotation lock detection current value which is set in advance.

According to another aspect of the present invention, there is provided a semiconductor integrated circuit for a regulator for forming a power supply device that supplies an operation voltage to a drive circuit which drives a motor to rotate, the semiconductor integrated circuit including: a voltage control transistor that is connected between a voltage input terminal to which a DC voltage is input and an output terminal to which an external load is connected; and a control circuit that controls the voltage control transistor according to a feedback voltage of an output, and a flag indicating an abnormality is raised in response to an electric current flowing to the voltage control transistor becoming smaller than a rotation lock detection current value which is set in advance.

According to the semiconductor integrated circuit for the regulator having any of the above configurations, when a motor driver is connected as a load to the output terminal, it is possible to detect the rotation lock state of the motor driver and output the detection signal (flag) outside. Thus, even when the motor driver breaks down, the control device (CPU) such as a microcomputer that controls the system can recognize the occurrence of the rotation lock state of the motor.

Preferably, the semiconductor integrated circuit for the regulator may further include a first external terminal for connecting a first current-voltage converting element that converts the electric current flowing to the first transistor into a voltage, and the first comparison circuit compares a voltage corresponding to the predetermined current value with the voltage obtained by converting of the electric current by the first current-voltage converting element connected to the first external terminal.

Since such a configuration includes an external terminal that connects an element (resistor) which converts an electric current proportional to the electric current flowing in the voltage control transistor into a voltage, it is possible to set a current value which is a reference of determination of the rotation lock state, arbitrarily and accurately according to the system.

Preferably, in the semiconductor integrated circuit for the regulator, a first capacity element is connected to the first external terminal in parallel with the first current-voltage converting element.

By such a configuration, when a motor driver as a load is connected to the output terminal, it is possible to prevent the output of the first comparison circuit from being wrongly inverted due to the influence of change (noise) appearing in the output current in accordance with the drive of motor in a steady state of the motor driver.

Preferably, the semiconductor integrated circuit for the regulator may further include: a second transistor which is provided in parallel with the voltage control transistor and the first transistor and to which an electric current in a proportional reduction from an electric current flowing to the voltage control transistor flows; a second current-voltage converting element that converts the electric current flowing to the second transistor into a voltage; and a second comparison circuit that compares the voltage obtained by converting of the electric current by the second current-voltage converting element with a second comparison voltage corresponding to a voltage obtained by current-voltage conversion of a short-circuiting abnormality detection current value which is set in advance, and determines which of the voltage obtained by the second current-voltage converting element and the second comparison voltage is larger, and an output of the second comparison circuit is inverted in response to the electric current flowing to the second transistor, the electric current being larger than the short-circuiting abnormality detection current value which is set in advance.

By such a configuration, it is possible to detect the short-circuiting state of the load (motor driver) connected to the output terminal, and output the detection signal outside.

Preferably, the semiconductor integrated circuit for the regulator may further include a delay circuit that delays an output of the second comparison circuit, wherein a signal obtained by having a logical sum of an output signal of the first comparison circuit and a signal delayed by the delay circuit is able to be output as an abnormality detection signal from the first output terminal.

By such a configuration, it is possible to prevent the output of the second comparison circuit from being inverted due to the rush current at the time of power activation, and it is also possible to decrease the number of external terminals to be provided to the IC and thus reduce the chip size since the rotation lock detection signal and the short-circuiting abnormality detection signal are output from a common output terminal.

Preferably, the semiconductor integrated circuit for the regulator may further include a second external terminal for connecting a second capacity element to form the delay circuit.

By such a configuration, it is possible to set the delay time of the delay circuit arbitrarily and accurately according to the system.

According to the above embodiment, in a semiconductor integrated circuit (regulator IC) forming a DC power supply device such as a series regulator, it is possible to detect the rotation lock state of a motor even when a motor driver having a motor lock detection function breaks down. Furthermore, it is possible to obtain a regulator IC that can form a motor system capable of detecting the rotation lock state without increasing the cost.

Although some embodiments of the present invention have been described and illustrated in detail, the disclosed embodiments are made for purposes of not limitation but illustration and example only. The scope of the present invention should be interpreted by terms of the appended claims.

What is claimed is:

1. A fan motor system, comprising:
a motor that rotates a fan;
a drive circuit that drives the motor to rotate; and
a semiconductor integrated circuit for a regulator, the semiconductor integrated circuit supplying an operation voltage of the drive circuit, and the semiconductor integrated circuit comprising:
   a voltage control transistor that is connected between a voltage input terminal to which a DC voltage is input and an output terminal;
   a control circuit that controls the voltage control transistor according to a feedback voltage of an output;
   a first transistor which is provided in parallel with the voltage control transistor and to which an electric current in a proportional reduction from an electric current flowing to the voltage control transistor flows;
   a first comparison circuit that determines which of the electric current flowing to the first transistor and a predetermined current value is larger;
   a first output terminal for outputting outside a determination result by the first comparison circuit;
   a second transistor which is provided in parallel with the voltage control transistor and the first transistor and to which an electric current in a proportional reduction from the electric current flowing to the voltage control transistor flows;
   a second current-voltage converting element that converts the electric current flowing to the second transistor into a voltage;
   a second comparison circuit that compares the voltage obtained by converting of the electric current by the second current-voltage converting element with a second comparison voltage corresponding to a voltage obtained by current-voltage conversion of an abnormality detection current value of the semiconductor integrated circuit which is set in advance, and determines which of the voltage obtained by the second current-voltage converting element and the second comparison voltage is larger; and
   an inverter circuit that inverts an output of the first comparison circuit in response to the electric current flowing to the first transistor, the electric current being smaller than a rotation lock detection current value of the drive circuit, the rotation lock detection current value being set in advance, and the inverter circuit being provided in a stage before an output transistor and generating a signal to be input to a gate terminal of the output transistor,
wherein:
an output of the second comparison circuit is inverted in response to the electric current flowing to the second transistor, the electric current being larger than the abnormality detection current value, and
an abnormality detection signal is output from the first output terminal in response to inversion of the output of one of the first comparison circuit and the second comparison circuit.

2. The fan motor system according to claim 1, further comprising a first external terminal for connecting a first current-voltage converting element that converts the electric current flowing to the first transistor into a voltage,
wherein the first comparison circuit compares a voltage corresponding to the predetermined current value with the voltage obtained by converting of the electric current by the first current-voltage converting element connected to the first external terminal.

3. The fan motor system according to claim 2, wherein a first capacity element is connected to the first external terminal in parallel with the first current-voltage converting element.

4. The fan motor system according to claim 1, further comprising a delay circuit that delays an output of the second comparison circuit,
wherein the abnormality detection signal is a signal obtained by having a logical sum of an output signal of the first comparison circuit and a signal delayed by the delay circuit.

5. The fan motor system according to claim 4, further comprising a second external terminal for connecting a second capacity element to form the delay circuit.

6. A fan motor system, comprising:
a motor that rotates a fan;
a drive circuit that drives the motor to rotate; and
a semiconductor integrated circuit for a regulator, the semiconductor integrated circuit supplying an operation voltage of the drive circuit, and the semiconductor integrated circuit comprising:
   a voltage control transistor that is connected between a voltage input terminal to which a DC voltage is input and an output terminal to which an external load is connected;
   a control circuit that controls the voltage control transistor according to a feedback voltage of an output;
   a rotation lock detection circuit which detects that an electric current flowing to the voltage control transistor becomes smaller than a rotation lock detection current value;
   an external terminal to output a detection result of the rotation lock detection circuit; and
   an abnormal current detection circuit which detects that an electric current flowing to the voltage control transistor becomes larger than an abnormal current detection value,
wherein:
an abnormality signal is output to the drive circuit from the external terminal in response to detection of a rotation lock state by the rotation lock detection circuit, and in response to detection of an abnormal current by the abnormal current detection circuit, the semiconductor integrated circuit performs one of (i) an overcurrent protection operation, and (ii) outputting of the abnormality signal from the external terminal.

* * * * *